United States Patent [19]

Farina

[11] Patent Number: 4,573,051
[45] Date of Patent: Feb. 25, 1986

[54] ADAPTIVE SYSTEM FOR SUPPRESSING INTERFERENCES FROM DIRECTIONAL JAMMERS IN ELECTRONICALLY OR MECHANICALLY SCANNING RADAR

[75] Inventor: Alfonso Farina, Rome, Italy
[73] Assignee: Selenia S.p.A., Rome, Italy
[21] Appl. No.: 404,234
[22] Filed: Aug. 2, 1982
[51] Int. Cl.[4] .............................................. G01S 7/36
[52] U.S. Cl. ................................ 343/18 E; 343/384; 343/781 P; 343/914
[58] Field of Search .................. 343/7 A, 16 M, 18 E, 343/379–383, 384

[56] References Cited

U.S. PATENT DOCUMENTS

| | | | |
|---|---|---|---|
| 3,435,453 | 3/1969 | Howard | 343/383 |
| 3,938,153 | 2/1976 | Lewis et al. | 343/381 |
| 3,938,154 | 2/1976 | Lewis | 343/381 |
| 4,044,359 | 8/1977 | Applebaum et al. | 343/379 |
| 4,204,211 | 5/1980 | Cavelos | 343/380 |
| 4,367,472 | 1/1983 | Hauptmann et al. | 343/7 A |
| 4,370,655 | 1/1983 | Masak | 343/383 |
| 4,434,424 | 2/1984 | Old | 343/381 |

Primary Examiner—Thomas H. Tarcza
Assistant Examiner—K. R. Kaiser
Attorney, Agent, or Firm—Karl F. Ross; Herbert Dubno

[57] ABSTRACT

A radar antenna with a collector of microwave energy incident along the main lobe of its radiation pattern, feeding a processor whose principal channel generates a raw output signal, is provided within the effective area of that collector with one or more ancillary radiation receivers intercepting energy from side lobes encumbered by interfering signals from directional jammers. The output signals of auxiliary channels connected to the ancillary radiation receivers are subtracted in the processor, at an intermediate-frequency level, from the raw output signal of the principal channel to produce a useful signal which is fed back to an adaptive cancellation loop in each of these auxiliary channels. The collector may be an electronically scanning phased array of elemental radiators, in which case the ancillary receivers are formed by respective subgroups of some of these radiators; alternatively, the collector could be a mechanically scanning reflector provided with apertures accommodating the ancillary radiation receivers.

3 Claims, 6 Drawing Figures

ADAPTIVE SYSTEM FOR SUPPRESSING INTERFERENCES FROM DIRECTIONAL JAMMERS IN ELECTRONICALLY OR MECHANICALLY SCANNING RADAR

FIELD OF THE INVENTION

My present invention relates to a system for the adaptive suppression of interferences from directional jammers in the receiving section of a signal processor of an electronically or mechanically scanning radar.

BACKGROUND OF THE INVENTION

A network of this type is the subject matter of my copending application, Ser. No. 404,236, filed Aug. 2, 1982. Microwave energy reflected by a target and incident on a radar antenna along a main lobe of its radiation pattern may be encumbered by interfering radiation from one or more jammers picked up along side lobes of that pattern. The superimposition of the interfering signals upon the incoming echoes creates disturbances in the evaluation of the echoes which may disorient the radar relatively to a target being tracked or searched for.

In the case of a mechanically scanning antenna it has already been proposed to suppress these interferences by the provision of ancillary antennas flanking the main antenna and participating in its scanning motion, these ancillary antennas being oriented along the side lobes of the main radiation or beam pattern from which interfering signals are received. The associated processor, in its receiving section, treats the collateral signals emitted by these ancillary antennas as representative of estimated disturbance and subtracts them from the raw output signal of the main antenna to produce a useful signal purged to a greater or lesser degree from these interferences.

This mode of operation, which reduces the gain of the main antenna in the directions of incidence of the interfering radiation, requires a number of ancillary antennas at least equal to the number of jammers whose signals are to be suppressed, along with as many auxiliary channels in the processor in which the collateral signals from the ancillary antennas are properly weighted. The same technique can be used in the case of an electronically scanning main antenna with a phased array of elemental radiators whose individual output signals are weighted by phase shifters in the principal channel of the processor, in conformity with the sweep of the radiation pattern, as is well known in the art.

A drawback of the method just described is the fact that the ancillary antennas have their phase centers necessarily offset from that of the main antenna by a distance greater than half the width of the effective area in which the desired incident radiation is being collected by a rotating reflector or by the array of elemental radiators. This offset, more fully discussed hereinafter, decorrelates the interfering signals processed in the principal and auxiliary channels so as to impair the suppression of the resulting disturbances.

With an electronically scanning antenna the disturbances could also be spatially filtered out by modifying the weighting coefficients for the output signals of all the elemental radiators so as to reduce the antenna gain in the suspected direction or directions of incidence of the jamming signals. This latter method, while more effectively suppressing the interferences, is rather cumbersome since it requires individual processing channels and weighting circuits for all the elemental radiators.

OBJECT OF THE INVENTION

The object of my present invention, therefore, is to provide means for the substantial suppression of interferences in a mechanically or an electronically scanning radar with avoidance of both the decorrelating offsets of the first method and the circuital complications of the second method discussed above.

SUMMARY OF THE INVENTION

This object is attained, in accordance with my present invention, by the provision of ancillary antenna means disposed within the effective area of a collector of incident microwave energy (i.e. a reflector or a phased array of elemental radiators) and oriented in the direction of one or more side lobes of the radiation pattern of the main antenna of which that collector forms part, an associated processor including at least one auxiliary receiving channel deriving a contamination signal —representing estimated disturbance—from a collateral signal emitted by the ancillary antenna means. The processor further comprises cancellation means connected to the auxiliary channel for differentially combining the contamination signal with the raw output signal from the principal channel to convert same into a purged useful signal.

Pursuant to a more particular feature of my invention, a subtractor included in the cancellation means has a first input receiving the raw output signal from the principal channel and a second input receiving the contamination signal from the auxiliary channel of the processor, the cancellation means further comprising an adaptive loop with mixer means linked by an output connection to the second input and by a feedback connection to the output of the subtractor. Advantageously, a first and a second mixer constituting the aforementioned mixer means have inputs connected in parallel to the auxiliary channel for receiving the contamination signal therefrom while the first mixer receives the useful signal from the subtractor output via the feedback connection and correlates it with the contamination signal for generating a corrective signal which is fed through an integrator to the second mixer for modulating the contamination signal before transmitting it to the subtractor.

In general, the number of ancillary antennas—and thus the number of auxiliary channels—should correspond to the number of jammers whose signals are to be suppressed. In the case of several auxiliary channels we prefer to provide the processor with adding means inserted between the output connections of the mixers of their respective adaptive loops and the second input of the subtractor which therefore receives a joint contamination signal to be differentially combined with the raw output signal of the principal channel.

When the main antenna is of the electronically scanning type, each ancillary antenna comprises a subgroup of elemental radiators encompassing a minor fraction of the number of such radiators constituting the phased array. The radiators of this subgroup are disconnected from the principal channel so as not to contribute to the main output signal. Their own output signals are, instead, weighted in a manner making them predominantly receptive to radiation incident along a side lobe of the beam pattern established by the remainder of the array. The great majority of the elemental radiators included in that remainder operate in the normal manner without the need for additional circuitry. The radiator subgroup forming an ancillary antenna may be disposed in close proximity to the phase center of the overall array so as to minimize the aforedescribed offset and to maintain virtual cophasality between the interfering signals traversing the principal and auxiliary channels. The maintenance of a certain separation between radiator subgroups designed to intercept jamming signals from different directions is, however, desirable for decoupling purposes; such subgroups, therefore, are preferably disposed in pairs on opposite sides of the geometrical center of the array.

BRIEF DESCRIPTION OF THE DRAWING

The above and other features of my invention will now be described in detail with reference to the accompanying drawing in which.

SPECIFIC DESCRIPTION

Figure 1:
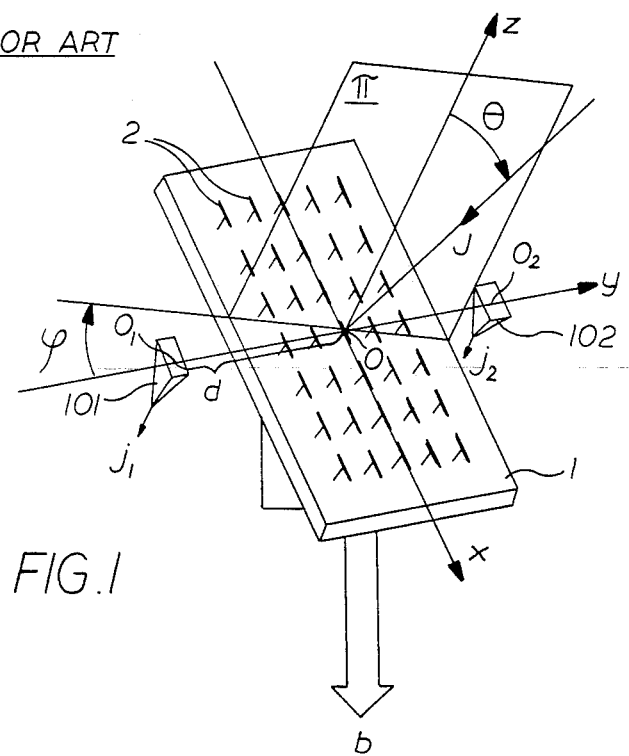
FIG. 1 is a diagrammatic perspective view of a main antenna of the phased-array type flanked by two ancillary antennas in accordance with conventional practice.

FIG. 1 shows a prior-art radar antenna 1 with a phased array of elemental radiators 2, i.e. dipoles, which transmit an outgoing beam of microwave energy and collect incoming echoes from reflecting targets. The received microwaves give rise to individual output signals of these dipoles, collectively designated b, which are fed to a nonillustrated processor for weighting by associated phase shifters as is well known in the art. Two ancillary antennas 101 and 102 emit collateral output signals $j_1$ and $j_2$ presumed to be due to intercepted jamming signals incident along respective side lobes of the radiation pattern of array 1. These collateral signals are utilized by the processor as estimated-disturbance signals to be subtracted from a raw output signal combined from the phase-shifted output signals of dipoles 2. Ancillary antennas 101 and 102 have been shown as horns with phase centers $O_1$ and $O_2$ spaced from the phase center 0 of the array 1 by a distance d dependent on the dimensions of array 1 whose area lies in the xy plane of a system of Cartesian coordinate axes x, y and z.

Let us consider an incoming beam J from a directional jammer defining with axis z a plane $\pi$, this beam including with axis z an angle $\theta$ while plane $\pi$ is inclined at an angle $\phi$ relative to the axis y. This results in a relative phase-shift equal to $d \cdot \sin\theta \cdot \cos\phi/c$ between the components of main signal b and of collateral signals $j_1$, $j_2$ due to this interfering radiation (c being the velocity of light), the decorrelation between these signal components being thus proportional to the offset d of the phase centers. It will be apparent that this offset d cannot be less than half the width of the main antenna 1.

FIG. 2 shows again an antenna 1 with a phased array of dipoles 2, similar to those illustrated in FIG. 1, which may be physically rotatable about a vertical axis for azimuthal scanning while being electronically controlled for scanning in elevation. It is, of course, also possible to control the phase shifters of the output signals of the rows and columns of dipoles 2 for electronic scanning in both elevation and azimuth. The majority of the dipoles deliver their individual output signals, collectively designated b, through a duplexer 3 into a processor whose receiving section includes network 5 forming a principal channel and network 6 containing a number of receiving channels, the latter being connected to small subgroups of dipoles 2 emitting collateral signals collectively designated j.

The components of the main signal b, weighted and combined in network 5, form a raw output signal s which is delivered to a disturbance-cancellation network 7; signal s is synthesized from microwave energy predominantly incident along the main lobe of the radiation pattern of antenna 1. Network 7 also receives estimated disturbance signals $a_1 \ldots a_n$ derived from the output signals j of respective subgroups of dipoles 2, the signals j being so weighted in their respective channels of network 6 that each collateral signal essentially carries microwave energy incident along one of the side lobes of the antenna pattern. The processor also has a transmitting section represented in FIG. 2 by a network 4 including a high-power generator of outgoing signals fed via duplexer 3 to all the dipoles 2 except those of the subgroups emitting the collateral signals j. In the case of a monopulse radar, network 4 will also include a source of gating pulses for the periodic unblocking of amplifiers in the outputs of all the dipoles at instants when an incoming echo pulse is to be evaluated. If the array 1 is only of passive type, designed to intercept the reflected microwave energy from beams transmitted by an associated active antenna, network 4 will lack the high-power generator of outgoing signals referred to above.

Figure 3:
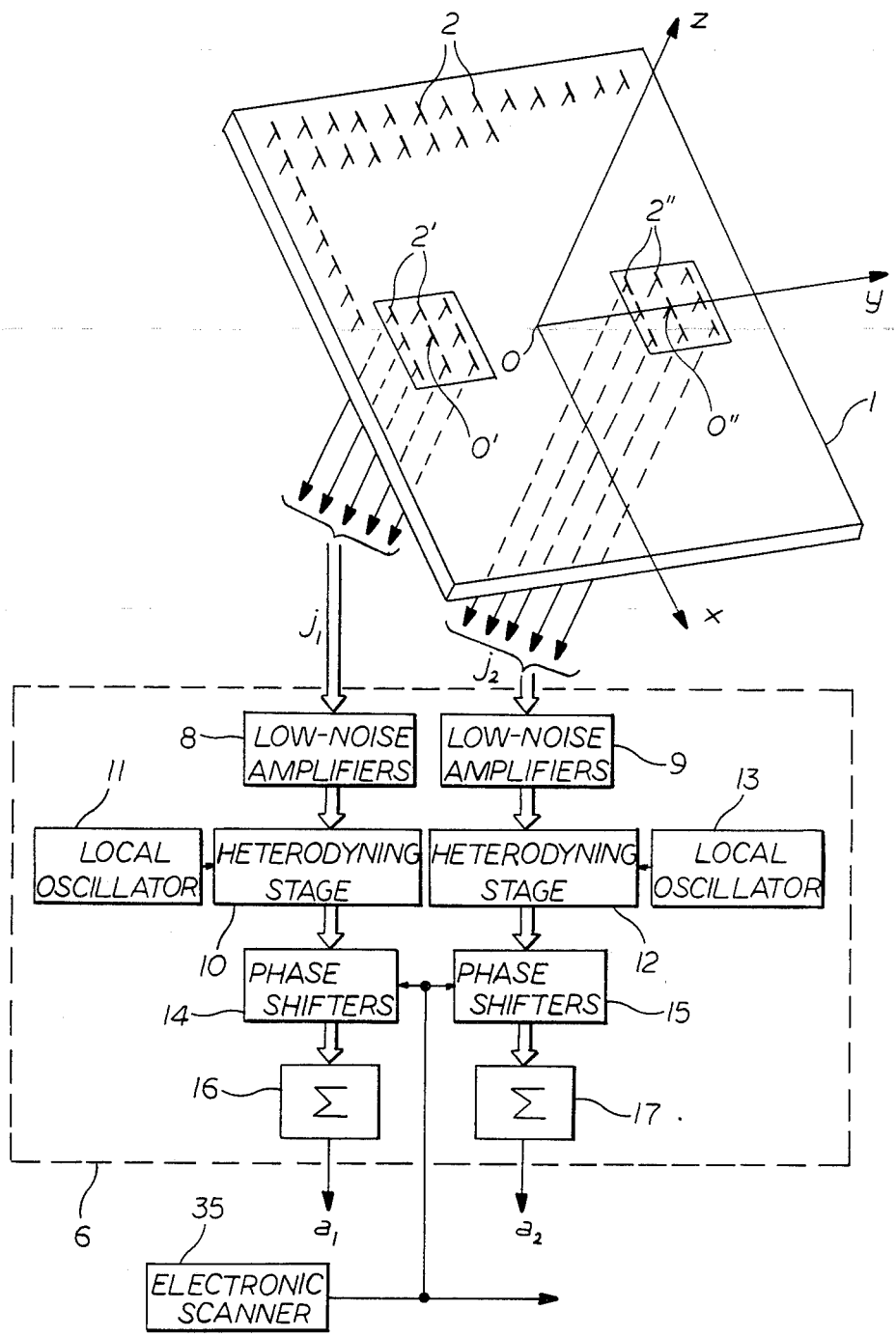
FIG. 3 is a more detailed diagrammatic representation of the array of FIG. 2 and of an associated processing network including two auxiliary receiving channels.

FIG. 3 shows details of the array of dipoles 2 and of processing network 6 containing the several auxiliary receiving channels; for simplicity's sake, however, only two such channels generating respective contamination signals $a_1$, $a_2$ have been illustrated. These auxiliary channels receive collateral signals $j_1$, $j_2$ from two subgroups of dipoles 2', 2" symmetrically disposed along axis y on opposite sides of phase center 0 which is closely spaced from the phase centers O', O" of these subgroups. Nevertheless, the two ancillary antennas constituted by dipoles 2' and 2" are sufficiently far apart to be electromagnetically decoupled from each other so as to enable mutually independent cancellation of disturbances due to respective jammers.

Processing network 6 comprises two sets of low-noise amplifiers 8 and 9 respectively receiving the individual output signals—again collectively designated $j_1$ and $j_2$—of dipoles 2' and 2", these collateral signals being transposed to a somewhat lower frequency level by heterodyning stages 10 and 12 having inputs connected to local oscillators 11 and 13. The stepped-down signals are weighted in associated phase shifters 14 and 15 and are ultimately added in summing circuits 16 and 17 to yield the respective contamination signals $a_1$ and $a_2$. Also shown in FIG. 3 is an electronic scanner 35 which continuously modifies the phase shifts of circuits 14 and 15 (as well as those of corresponding circuits in the principal receiving channel 5) to generate a sweep in the elevational plane xz.

Let us assume, by way of example, that the rectangular antenna array shown in FIG. 3 consists of 3,000 dipoles operating with a main-lobe antenna gain of about 40 dB. If the side lobes of interest in connection with directional jammers have a gain reduced by 23 dB below that of the main lobe, sixteen dipoles 2' and as many dipoles 2'' will suffice to establish a gain of 17 dB for the subgroups constituting the two ancillary antennas. Thus, the combined number of dipoles excluded from the main lobe corresponds to substantially 1% of the total; this will not significantly affect the quality of the output signal s emitted by the principal receiving channel 5.

Figure 4:
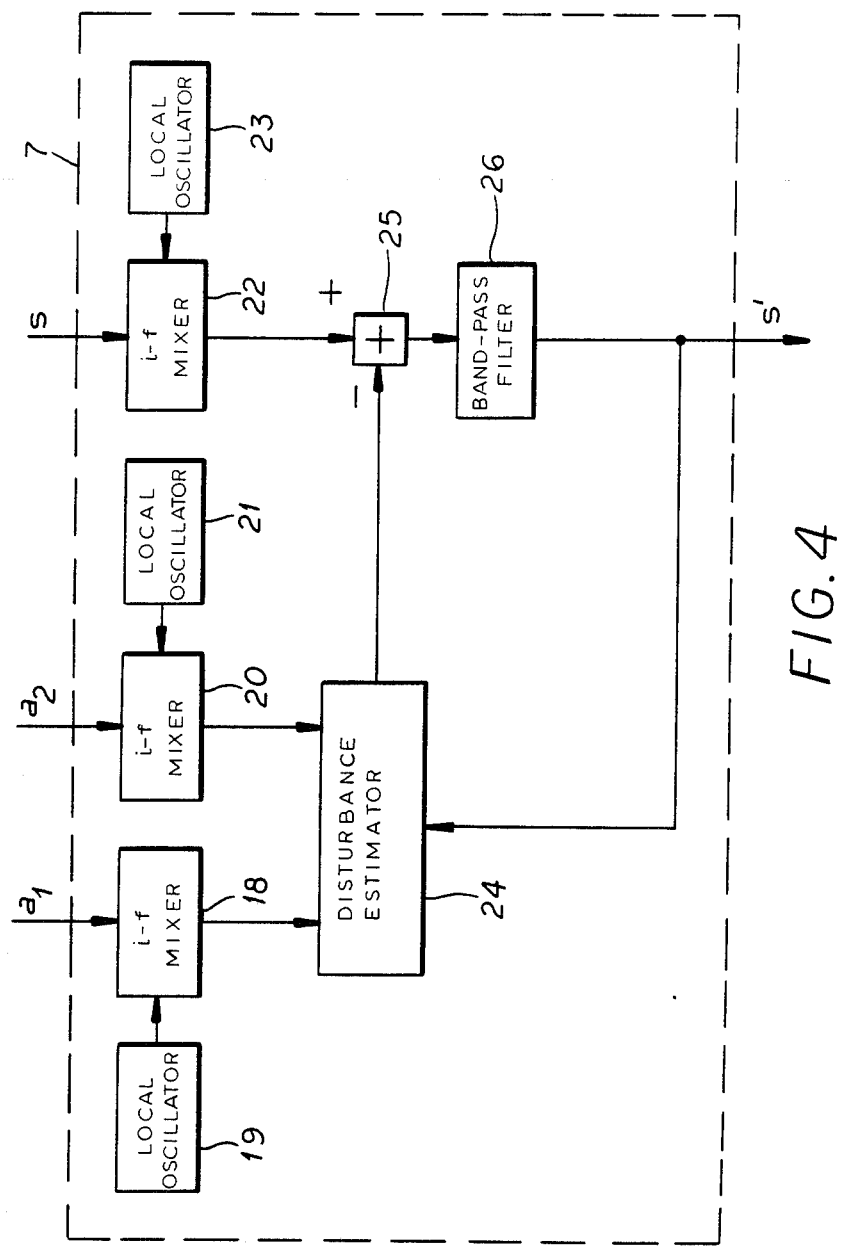
FIG. 4 is a block diagram of a disturbance-cancellation network constituting one of the processing networks shown in FIG. 2.

The disturbance-cancellation network 7 included in the receiving section of the processor has been more fully illustrated in FIG. 4. Included in that network are mixers 18, 20 and 22 connected to local oscillators 19, 21 and 23 for stepping down the contamination signals $a_1$, $a_2$ and the raw output signal s to the intermediate-frequency range; mixer 22 and oscillator 23 can be omitted if the signal s issuing from processing network 5 is already in that range. A disturbance estimator 24, receiving the stepped-down signals $a_1$ and $a_2$, delivers their sum to the subtractive input of an algebraic adder 25—such as a differential amplifier—whose additive input receives the raw output signal s. Subtractor 25 emits a purged useful signal s' which, after clearing a band-pass filter 26, is fed back to estimator 24 in an adaptive cancellation loop illustrated in greater detail in FIG. 5.

Figure 2:
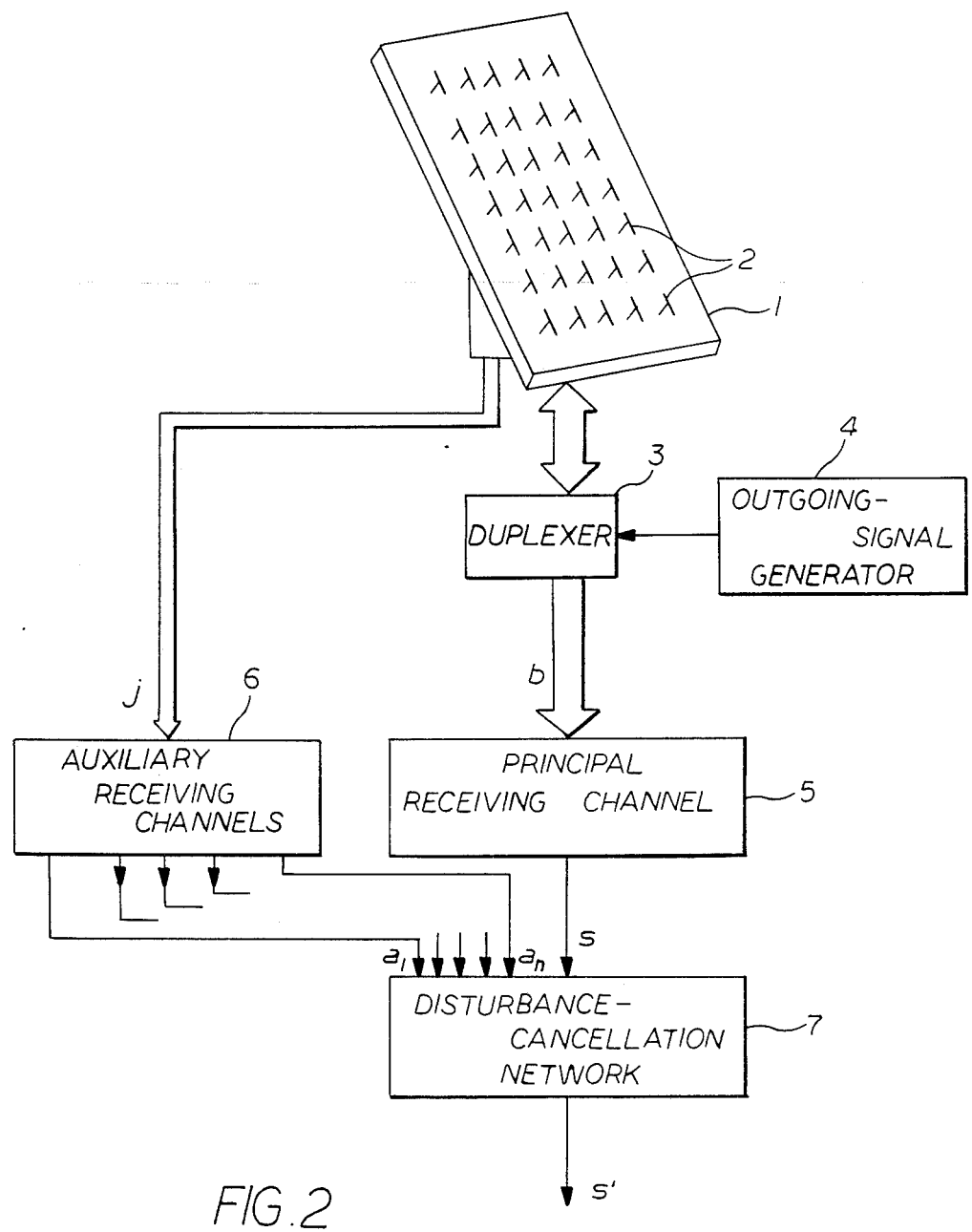
FIG. 2 is a view generally similar to that of FIG. 1 but showing a phased radiator array and associated processing networks according to my invention.

As particularly shown in the latter Figure, disturbance estimator 24 is divided into two identical parts respectively assigned to signals $a_1$ and $a_2$; it will be apparent that the number of such parts can be increased if there are more than two ancillary antennas included in the antenna array of FIG. 2. The left-hand part of estimator 24 comprises a first mixer 27 receiving the contamination signal $a_1$ in parallel with a second mixer 31; another input of mixer 27 receives the purged signal s fed back from the output of band-pass filter 26. Mixer 27, correlating the signal $a_1$ with a corresponding component of signal s', emits a corrective signal by way of a narrow-band filter 28 to another input of mixer 31 which modulates the signal $a_1$ with that corrective signal; filter 28, whose pass band is much narrower than that of filter 26, acts as an integrator whose time constant substantially exceeds the shortest period of variation of the detected jamming signal.

Mixer 27 and filter 28 constitute a cross-correlation loop 34' which is virtually identical with a cross-correlation loop 34'' in the right-hand part of disturbance estimator 24, the latter loop including a mixer 29 and a narrow-band filter 30 working into another mixer 32 which modulates the contamination signal $a_2$ with a corrective signal from loop 34''. The first mixer 29 of this part of the circuit also receives the purged signal s' fed back from band-pass filter 26. Second mixers 31 and 32 work into an adder 33 which delivers the sum of their signals to subtractor 25.

Figure 5:
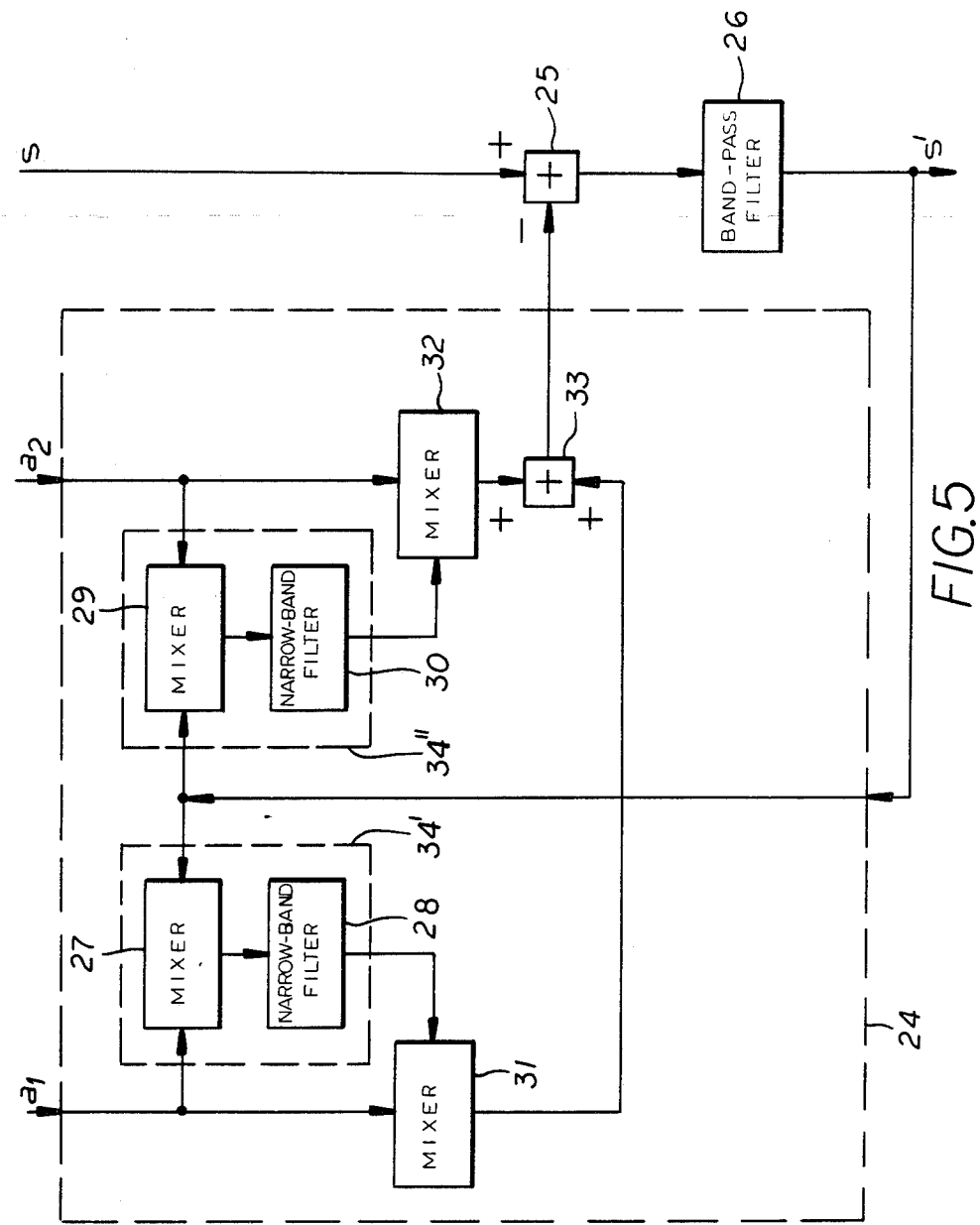
FIG. 5 is a block diagram of a disturbance estimator constituting one of the blocks in the diagram of FIG. 4.

While the signals processed by the circuitry of FIGS. 3–5 are of analog nature, they could just as well be digitized with suitable modification of the evaluation system represented by networks 5–7.

In principle, signals $a_1$, $a_2$ and s could also be fed to cancellation network 7 at the video-frequency rather than at the intermediate-frequency level, with filters 28 and 30 of the low-pass instead of the band-pass type.

The presence of an i-f carrier in the cross-correlation loops 34' and 34'', however, stabilizes their operation against frequency drifts which could be caused by spurious d-c components issuing from mixers 27 and 29 in the absence of such a carrier.

Figure 6:
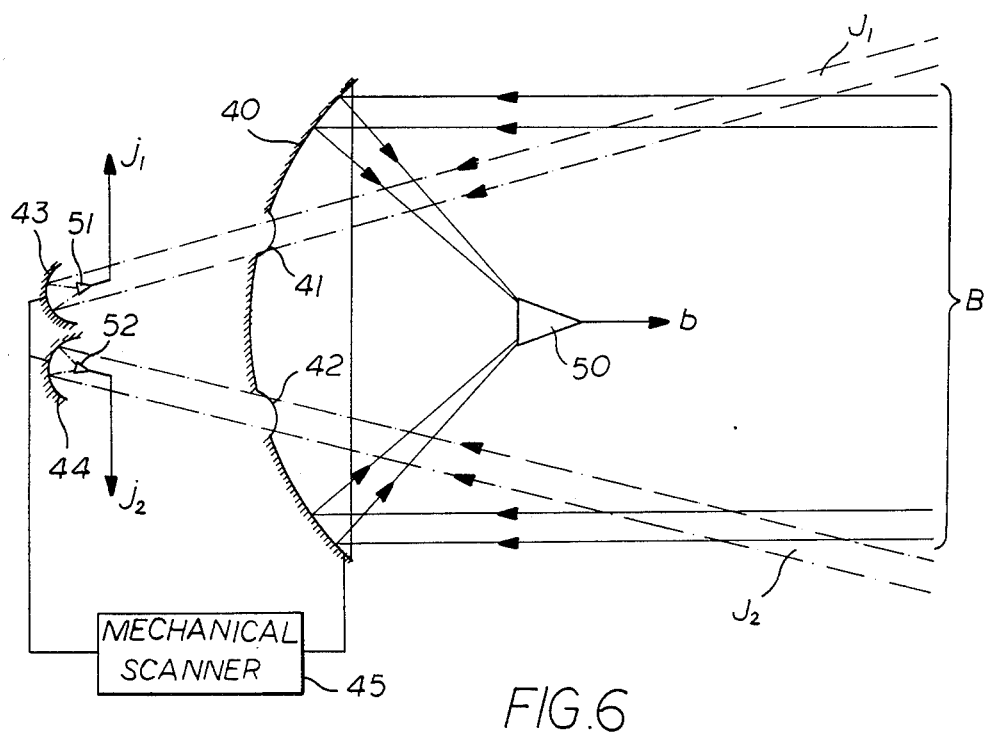
FIG. 6 diagrammatically illustrates a mechanically scanning radar antenna modified in accordance with my present invention.

In FIG. 6 I have shown an application of my invention to a mechanically scanning antenna comprising a parabolic reflector 40 and a horn 50 at its focal point. An axially incident beam D of microwave radiation is focused upon horn 50 to produce the main output signal b. Obliquely incident beams $J_1$ and $J_2$ from directional jammers pass through apertures 41 and 42 in reflector 40 and are intercepted by ancillary antennas shown to comprise considerably smaller microwave receivers in the form of reflectors 43, 44 with associated horns 51, 52 which emit the collateral signals $j_1$, $j_2$. Here, too, the ancillary antennas lie within the effective area of the main radiation collector constituted by reflector 40; it should also be noted that the phase centers of horns 51 and 52 receive the beams $J_1$, $J_2$ via ray paths whose length, measured from the concave surface of reflector 40, substantially equals the distance of that surface from the phase center of horn 50 so that the interfering components of signals b, $j_1$ and $j_2$ are essentially in phase. Also shown in FIG. 6 is a mechanical scanner 45 jointly rotating the main antenna 40, 50 and the ancillary antennas 43, 51 and 44, 52. The treatment of the output signals b, $j_1$ and $j_2$ of these antennas is the same as that described with reference to FIGS. 2–5.

The adaptive cancellation loop shown in FIGS. 4 and 5, including the feedback connection from filter 26, compensates for the relative displacement of the antenna 1 and the sources of interfering radiation due to the scanning sweep and to possible motion of the jammers themselves. The sweep will also affect the relative positions of the main and side lobes, the resulting signal variations being likewise balanced out by the adaptive loop.

The number of ancillary antennas and associated receiving channels could exceed that of the jammers to be neutralized, in order to increase the efficiency of the disturbance canceler.

I claim:
1. In a radar having a main antenna with a collector of microwave energy incident along a main lobe of a radiation pattern thereof, the incident energy received within an effective area of said collector being encumbered by interfering radiation from a directional jammer propagating along a side lobe of said pattern, and a processor with a principal receiving channel for translating the incident microwave energy from said collector into a raw output signal contaminated by the interfering radiation, the combination therewith of ancillary antenna means disposed within the effective area of said collector and oriented in the direction of said side lobe for picking up said interfering radiation and translating same into a collateral signal, said processor further including at least one auxiliary receiving channel connected to said ancillary antenna means for generating a contamination signal derived from said collateral signal and cancellation means connected to said auxiliary channel where said cancellation means comprises a subtractor with a first input receiving said raw output signal from said principal channel and a second input receiving said contamination signal from said auxiliary channel and band-pass filter coupled to output of said subtractor, said cancellation means further comprising an adaptive loop including mixer means with an output connection extending to said second input of said subtractor and with a feedback connection coupled to an output of said band-pass filter, said collector comprising a reflector centered on an axis and a first horn at focal point of said reflector, said ancillary antenna comprising first and second microwave receivers positioned for irradiation through apertures of said reflector, said first and second microwave receivers each comprise second and third horns respectively, distances of phase centers of said second and third horns to said reflector equal distance of said first horn to said reflector, said reflector and said first and second microwave receivers are coupled with mechanical scanning means for joint displacement.

2. The combination defined in claim 1 wherein said mixer means comprises a first and a second mixer with inputs connected in parallel to said auxiliary channel for receiving said signal therefrom, said first mixer further receiving said useful signal from said feedback connection and correlating same with said contamination signal for generating a corrective signal fed via an integrator to said second mixer for modulating said contamination signal prior to the transmission thereof to said subtractor.

3. The combination defined in claim 2 wherein said principal and auxiliary channels include heterodyning means for modulating received microwave signals upon an intermediate-frequency carrier, said integrator comprising a narrow-band filter centered upon said carrier.

* * * * *